(12) United States Patent
Chiappa

(10) Patent No.: US 7,708,314 B2
(45) Date of Patent: May 4, 2010

(54) EMERGENCY CUTTING DEVICE FOR VEHICLE SAFETY BELTS

(76) Inventor: Gianluca Chiappa, Via Serena 5, Pavona (RM) (IT) I-00040

( * ) Notice: Subject to any disclaimer, the term of this patent is extended or adjusted under 35 U.S.C. 154(b) by 0 days.

(21) Appl. No.: 12/227,946

(22) PCT Filed: Jun. 6, 2007

(86) PCT No.: PCT/IT2007/000401

§ 371 (c)(1),
(2), (4) Date: Dec. 2, 2008

(87) PCT Pub. No.: WO2007/144923

PCT Pub. Date: Dec. 21, 2007

(65) Prior Publication Data

US 2009/0173198 A1    Jul. 9, 2009

(30) Foreign Application Priority Data

Jun. 12, 2006    (IT)    .................... RM2006A000307

(51) Int. Cl.
*B60R 22/00*    (2006.01)
(52) U.S. Cl. .................................................. 280/801.1
(58) Field of Classification Search ............... 280/801.1, 280/808, 733
See application file for complete search history.

(56) References Cited

FOREIGN PATENT DOCUMENTS

| DE | 298 09 585 | U1 | | 8/1998 |
|---|---|---|---|---|
| EP | 0 267 893 | A | | 5/1988 |
| FR | 2 382 902 | A | | 10/1978 |
| FR | 2581944 | A1 | * | 11/1986 |
| GB | 2038163 | A | * | 7/1980 |
| WO | WO 2005/037615 | A1 | | 4/2005 |

OTHER PUBLICATIONS

PCT Search Report dated Nov. 21, 2007.

* cited by examiner

*Primary Examiner*—Faye M. Fleming
(74) *Attorney, Agent, or Firm*—Hedman & Costigan, P.C.; James V. Costigan

(57) ABSTRACT

The invention relates to an emergency cutting device (1) for vehicle safety belts, characterised in that it comprises locking means (6,7), acting on a safety belt (3) so as to put the same under tension; means (8) for cutting said safety belt (3); and operation means (12, 13), operatively connected with said locking means (6, 7) and with said cutting means (8); said operation means (9, 10) activating in succession said locking means (6,7) and said cutting means (8), so as to cut said safety belt (3), and then deactivating said locking means (6, 7) thus freeing said safety belt (3) and then the user of the same.

14 Claims, 4 Drawing Sheets

EMERGENCY CUTTING DEVICE FOR VEHICLE SAFETY BELTS

The present invention relates to an emergency cutting device for vehicle safety belts.

More specifically, the invention relates to a cutting device studied and realised for permitting to the passengers or driver of any kind of vehicle, such as a car, to be able easily freeing from safety belts in an emergency case.

As it is well known, substantially all traffic regulations of industrialized countries provide the compulsory use of safety belt. Particularly, it has been ascertained that is permits limiting consequences of road accidents.

However, although said safety belts are very important, they are in some cases dangerous. Particularly, it has been observed that in case of upturning of the vehicle, release button fails, preventing the driver or the passenger to quickly free him/herself to immediately abandon the vehicle in case of failure. The only way for vehicle driver of passenger to free from said safety belts would be that of cutting said safety belts.

The above situation has been also noted by firemen, frequently facing the situation of freeing the driver or passengers from safety belts cutting the same, to take them out from the vehicle.

In view of the above, it is object of the present invention that of permitting to the driver or to the passenger of a vehicle to be able to free from the safety belt independently from the operation of the release button, and to the rescue services to easy extraction operations from vehicle in case of accident.

Another object of the present invention is that of ensuring operation of the above device even in case of electric failures of the vehicle or of the feeding of the same.

It is therefore specific object of the present invention an emergency cutting device for vehicle safety belts, characterised in that it comprises locking means, acting on a safety belt so as to put the same under tension; means for cutting said safety belt; and operation means, operatively connected with said locking means and with said cutting means; said operation means activating in succession said locking means and said cutting means, so as to cut said safety belt, and then deactivating said locking means thus freeing said safety belt and then the user of the same.

Always according to the invention, said locking means can comprise a first and a second clamp, closable each other to lock said safety belt, and a first and a second piston, substantially parallel each other, coupled, respectively, to said first and said second clamp, to close and open the relevant clamp.

Still according to the invention, surface between said first and said second clamp locking said safety belt can be corrugated.

Furthermore, according to the invention, said cutting means can be interposed between said first and said second piston.

Advantageously, according to the invention, said safety belt can be introduced within a channel passing through a unit, said cutting means and said locking means being installed within said unit.

Always according to the invention, said device can comprise a further piston fixed to said cutting means for operating the same.

Still according to the invention, said cutting means can be comprised of at least a blade, preferably a steel blade.

Furthermore, according to the invention, said operation means can be comprised of a control unit connected with said locking means and with said cutting means, and a button electrically connected with said control unit.

Advantageously, according to the invention, said device can comprise acoustic and/or lighting warning means, connected with said button.

Always according to the invention, said control unit can activate said cutting means a plurality of times until cutting said safety belt.

Still according to the invention, said control unit can be connected with the airbag activation circuit, said device being activated by the explosion of said airbag.

Furthermore, according to the invention, said button can be protected by a door controlled by said control unit, said control unit opening said door by said airbag explosion.

Advantageously, according to the invention, said control unit can comprise timing means, said device activating after a pre-set time period from said airbag explosion.

Preferably, according to the invention, said device can comprise a buffer battery and can be provided close to the safety belt winding device, preferably on a vehicle upright.

Further according to the invention, said device can comprise sensors installed in the safety belt hook, so as to activate only when said safety belts are fastened.

The present invention will be now described, for illustrative but not limitative purposes, according to its preferred embodiments, with particular reference to the figures of the enclosed drawings, wherein.

Figure 1:
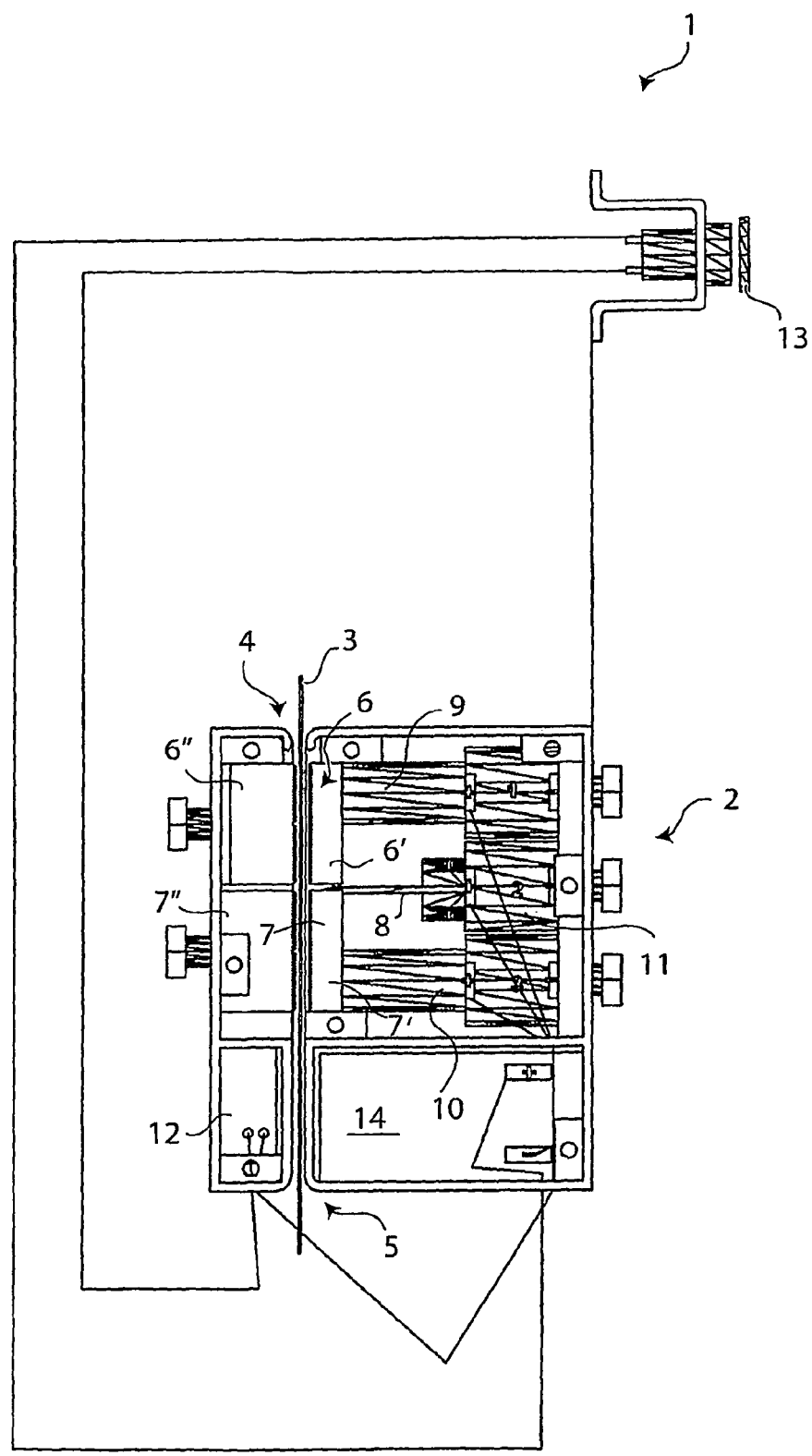
FIG. 1 shows a schematic representation of the operation of the emergency device for vehicle safety belts according to the invention.

Making reference to FIG. 1, it is possible observing schematic representation of operation of an emergency device for vehicle safety belts according to the present invention.

Device 1 is comprised of a unit 2 (lateral, open view) through which the safety belt 3 passes. Said safety belt 3 enters through opening 4 and exits through opening 5, passing within an inner passing channel.

Unit 2 provides inside two clamps 6, 7, each one comprised of two opposed elements 6', 6" and 7', 7", between which safety belt 3 passes.

A slot is provided between said two clamps 6 and 7, within which passes a blade 8, preferably comprised of steel.

Two electrically operated pistons 9, 10 are respectively applied to said elements 6', 7' so as to move them.

Device 1 also provides a piston 11 coupled with said blade 8, permitting sliding of the same within said slot between clamps 6 and 7.

Pistons 9, 10 and 11 are electrically connected with a control unit 12, handling its activation, e.g. supplying coils inside said pistons.

Said control unit 12 is introduced within unit 2 and is connected with a button 13 to activate said device 1.

In the present embodiment, device 1 is supplied by vehicle battery. In any case, it is also provided a buffer battery 14, charging when it is not used. In case of failure of energy supply, emergency device 1 can operate thanks to said buffer battery 14.

Device 1 can be placed close (preferably above) the device for winding the safety belt.

In case, for example as a consequence of a road accident, the user (driver or passenger) cannot release the safety belt 3, the same user pushes the button 13, and control unit 12 activates electric pistons 9 and 10. The latter closes clamps 6 and 7, pushing elements 6' and 7' against elements 6" and 7". Said opposed elements 6, 6" and 7', 7" have corrugate coupling surfaces, so as to make safer locking of safety belt 3.

Thus, safety belt 3 is kept tight between two clamps 6 and 7.

Then, said control unit 12 activates electric piston 11, making blade 8 sliding between two clamps 6 and 7, thus cutting safety belt 3.

Said control unit 12 can also activate more than once electric piston 11, until completely cutting safety belt 3.

Finally, control units 12 retract pistons 9 and 10, so as to release safety belt 3 permitting to the user to free from the safety belt.

Figure 2:
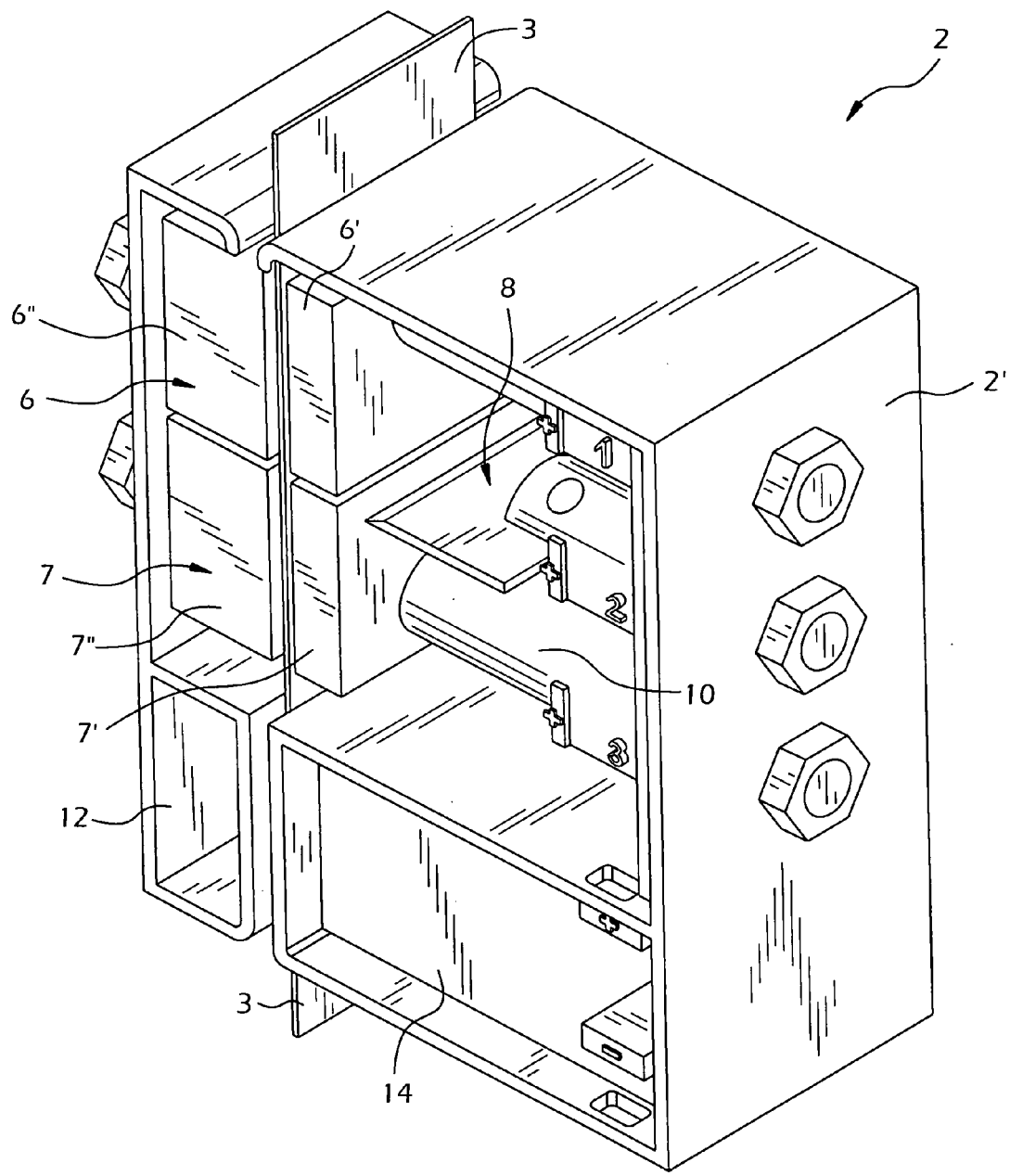
FIG. 2 shows an embodiment of the emergency device according to the invention in a rest position.
Figure 3:
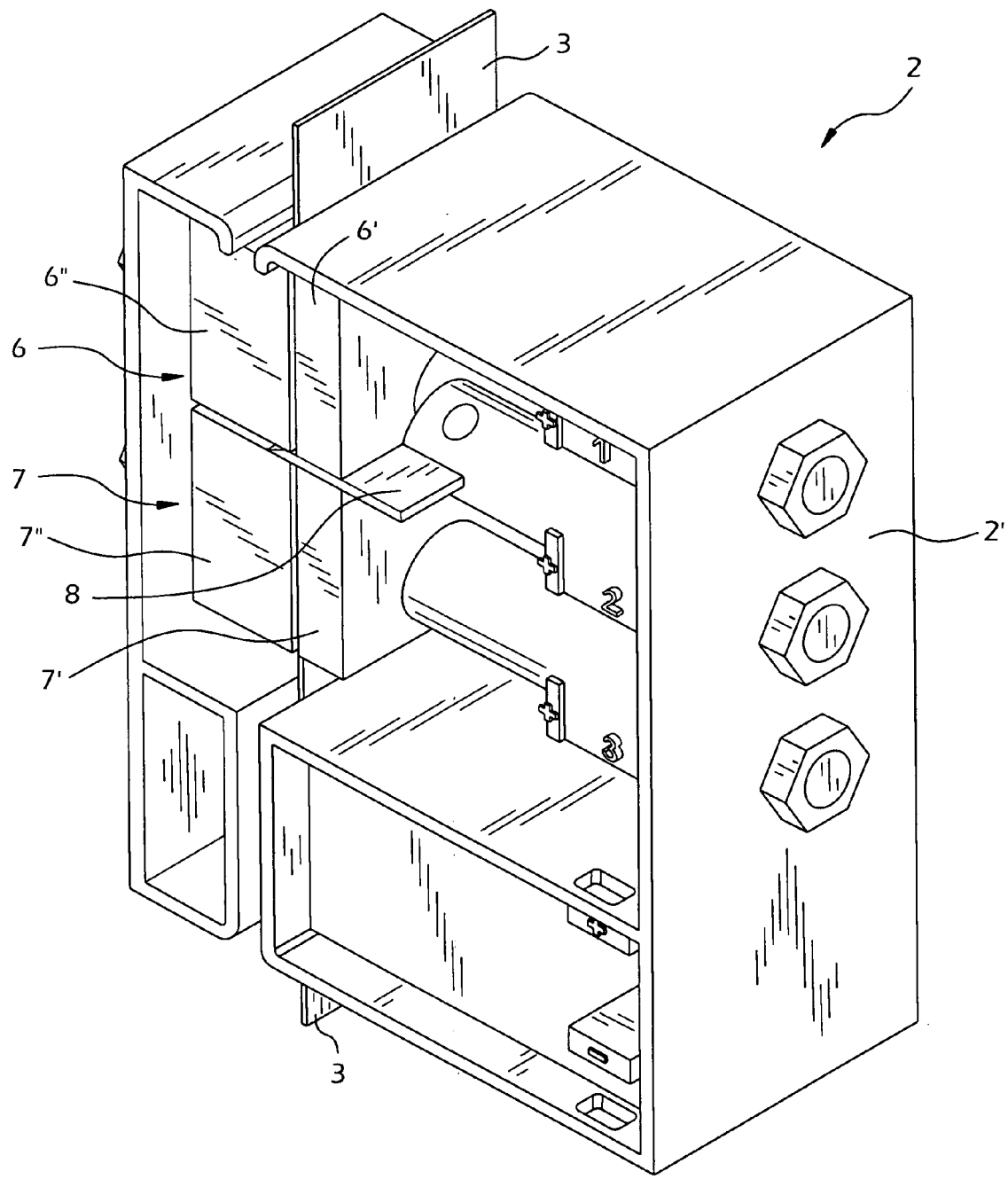
FIG. 3 shows an embodiment of the emergency device according to FIG. 2 while cutting the safety belt.

FIGS. 2 and 3 clearly show phases of cutting of safety belt 3.

Particularly, from FIG. 2 it is observed retracted position of blade 8 and the unit 2 box 2', preferably a metallic box, that can be accessed through a dismountable panel.

From FIG. 3 it is possible noting closure of clamps 6, 7, tightening safety belt 3, and operation and sliding of blade 8 between said clamps 6 and 7 for cutting safety belt 3.

Cutting of said safety belt 3 can be carried out automatically, with the help of the control unit 12, or manually, e.g. by a mechanical activation device.

Preferably, unit 2 is provided just above safety belt winding device and fixed to the vehicle upright by screws. If said unit 2 separates from upright, e.g. in case of shock, said device 1 can still operate and cut safety belt 3.

Button 13 can be operated both by user within the vehicle and by rescue services.

Control unit 12 can be also connected with the airbag activation circuit, and can be provided with a timer, so as to automatically cut the safety belt in case of accident, after the airbag explosion.

Sensors are also provided installed in the hook of the belt, so that device 1 operates also in case of real fastening of the same.

Figure 4:
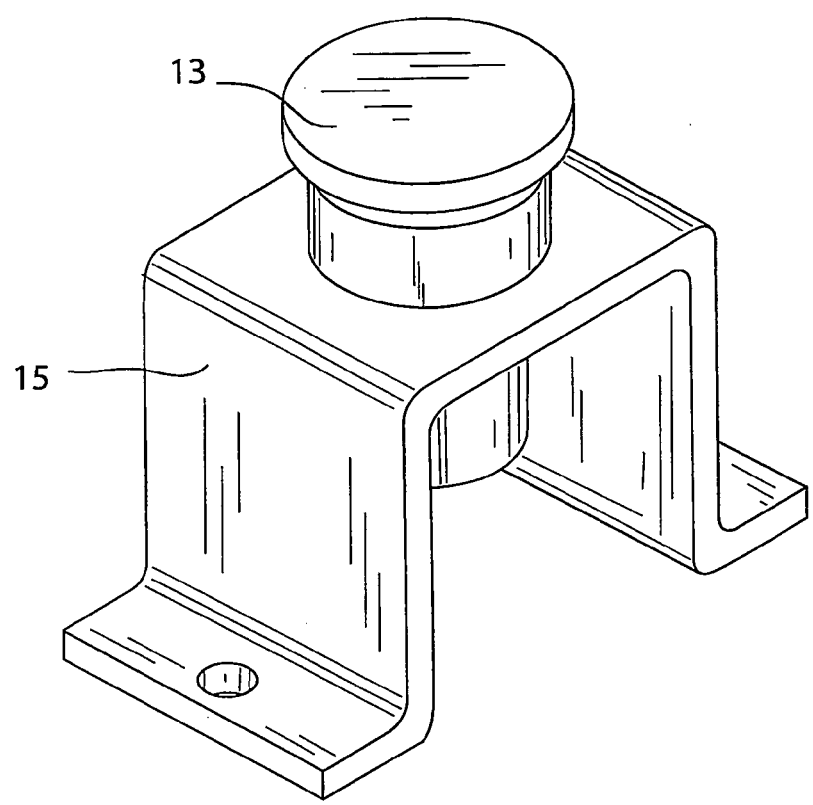
FIG. 4 shows a button for actuation of the device according to FIG. 1.

Button 13, that can be observed in FIG. 4, is installed on a support 15 and can be protected by a door (not shown in the figures). Said door will open after the airbag explosion, making is accessible button 13 only in case of real potential emergency situation.

Button 13 can be provided with intermittence light and acoustic warning device that will switch off after a period of time from the opening of the door or from the activation of device 1.

On the basis of the previous specification, it can be observed that basic feature of the present invention is that of providing a pre-tightening of safety belt and a cutting of the same permitting freeing user in case of emergency.

An advantage of the present invention is that of permitting its activation both by the user and by the emergency rescue services.

The present invention has been described for illustrative but not limitative purposes, according to its preferred embodiments, but it is to be understood that modifications and/or changes can be introduced by those skilled in the art without departing from the relevant scope as defined in the enclosed claims.

The invention claimed is:

1. Emergency cutting device (1) for vehicle safety belts, wherein it comprises locking means (6,7), acting on a safety belt (3) so as to put the same under tension; means (8) for cutting said safety belt (3); and operation means (12, 13), operatively connected with said locking means (6, 7) and with said cutting means (8); said operation means (12, 13) activating in succession said locking means (6, 7) and said cutting means (8), so as to cut said safety belt (3), and then deactivating said locking means (6, 7) and free said safety belt (3) and a user of the safety belt said locking means comprising a first and a second clamp (6, 7), closable to lock said safety belt (3), and a first and a second piston (9, 10), parallel to each other that said first and said second pistons (9,10), are coupled, respectively, to said first and said second clamp (6, 7), to close and open said first and said second clamp (6, 7).

2. Device (1) according to claim 1, wherein a surface between said first and said second clamp locking said safety belt is corrugated.

3. Device (1) according to claim 1, wherein said cutting means (8) are interposed between said first and said second piston (9, 10).

4. Device (1) according to claim 1, wherein said safety belt is introduced within a channel passing through a unit (2), said cutting means (6) and said locking means (6, 7) being installed within said unit.

5. Device (1) according to claim 1, wherein said device (1) also comprises a piston (11) fixed to said cutting means (8) for operating said cutting means.

6. Device (1) according to claim 1, wherein said operation means are comprised of a control unit (12) connected with said locking means (6, 7) and with said cutting means (8), and a button (13) electrically connected with said control unit (12).

7. Device (1) according to claim 6, wherein said device (1) comprises acoustic and/or lighting warning means, connected with said button (13).

8. Device (1) according to claim 6, wherein said control unit (12) activates said cutting means (8) a plurality of times until said safety belt (3) is cut through.

9. Device (1) according to claim 6, wherein said control unit (12) is connected with an airbag activation circuit, said device (1) being activated by the explosion of said airbag.

10. Device (1) according to claim 9, wherein said button (13) is protected by a door controlled by said control unit (12), said control unit (12) being activated to open said door by said airbag explosion.

11. Device (i) according to claim 9, wherein said control unit (12) comprises timing means, said device (1) activating after a pre-set time period from said airbag explosion.

12. Device (1) according to claim 1, wherein said device comprises a buffer battery (14).

13. Device (1) according to claim 1, wherein said device is provided close to the safety belt (3) winding device, preferably on a vehicle upright.

14. Device (1) according to claim 1, wherein said device corn rises sensors installed in a safety belt (3) hook, so as to activate only when said safety belts (3) are fastened.

* * * * *